United States Patent
Matsumoto et al.

(10) Patent No.: US 9,227,400 B2
(45) Date of Patent: Jan. 5, 2016

(54) EJECTION CONDITION DETERMINATION METHOD, IMAGE FORMING METHOD, AND IMAGE FORMING APPARATUS

(71) Applicant: FUJIFILM Corporation, Tokyo (JP)

(72) Inventors: Tsuyoshi Matsumoto, Tokyo (JP); Hiroyuki Shibata, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 42 days.

(21) Appl. No.: 14/034,227

(22) Filed: Sep. 23, 2013

(65) Prior Publication Data

US 2014/0085656 A1    Mar. 27, 2014

(30) Foreign Application Priority Data

Sep. 24, 2012    (JP) ................................. 2012-209754

(51) Int. Cl.

| | |
|---|---|
| *G06F 3/12* | (2006.01) |
| *B41J 2/07* | (2006.01) |
| *B41J 2/155* | (2006.01) |
| *B41J 2/165* | (2006.01) |

(Continued)

(52) U.S. Cl.
CPC .. *B41J 2/07* (2013.01); *B41J 2/155* (2013.01); *B41J 2/16585* (2013.01); *B41J 2/2139* (2013.01); *H04N 1/00278* (2013.01)

(58) Field of Classification Search
USPC ...................................... 358/1.13, 1.1; 347/14
See application file for complete search history.

(56) References Cited

U.S. PATENT DOCUMENTS

| | | |
|---|---|---|
| 6,454,390 B1 | 9/2002 | Takahashi et al. |
| 8,496,313 B2 | 7/2013 | Ueshima |

(Continued)

FOREIGN PATENT DOCUMENTS

| | | |
|---|---|---|
| EP | 1 681 168 A2 | 7/2006 |
| JP | 2006-76086 A | 3/2006 |

(Continued)

OTHER PUBLICATIONS

Japanese Office Action dated Sep. 2, 2014, with English Translation thereof.

(Continued)

*Primary Examiner* — Martin Mushambo
(74) *Attorney, Agent, or Firm* — McGinn IP Law Group PLLC

(57) ABSTRACT

An ejection condition determination method in an image forming apparatus includes: selecting two or more kinds of ejection conditions regarding other recording elements than a specified recording element among plural recording elements; acquiring drawing data representing two or more drawing patterns having different density distributions, the drawing data being acquired by respectively forming same drawing patterns using the selected two or more kinds of ejection conditions in a specified non-ejection state; performing a filter processing corresponding to human visual characteristics on the acquired drawing data so as to obtain visual correction drawing data; and determining the ejection conditions for compensating for a density variation of the image due to the specified non-ejection state based upon evaluation results which are obtained by respectively evaluating two or more drawing patterns represented by the visual correction drawing data and having been subjected to the filter processing according to a predetermined evaluation condition.

19 Claims, 17 Drawing Sheets

(51) Int. Cl.
*B41J 2/21* (2006.01)
*H04N 1/00* (2006.01)

(56) References Cited

U.S. PATENT DOCUMENTS

2002/0030709 A1 3/2002 Iwasaki et al.
2007/0132804 A1* 6/2007 Chiwata .......................... 347/19
2008/0036812 A1 2/2008 Kakutani
2011/0234673 A1* 9/2011 Ueshima ......................... 347/14

FOREIGN PATENT DOCUMENTS

| | | |
|---|---|---|
| JP | 2007-160748 A | 6/2007 |
| JP | 2011-201121 A | 10/2011 |
| JP | 2012-71474 A | 4/2012 |

OTHER PUBLICATIONS

European Search Report dated Feb. 13, 2014.

* cited by examiner

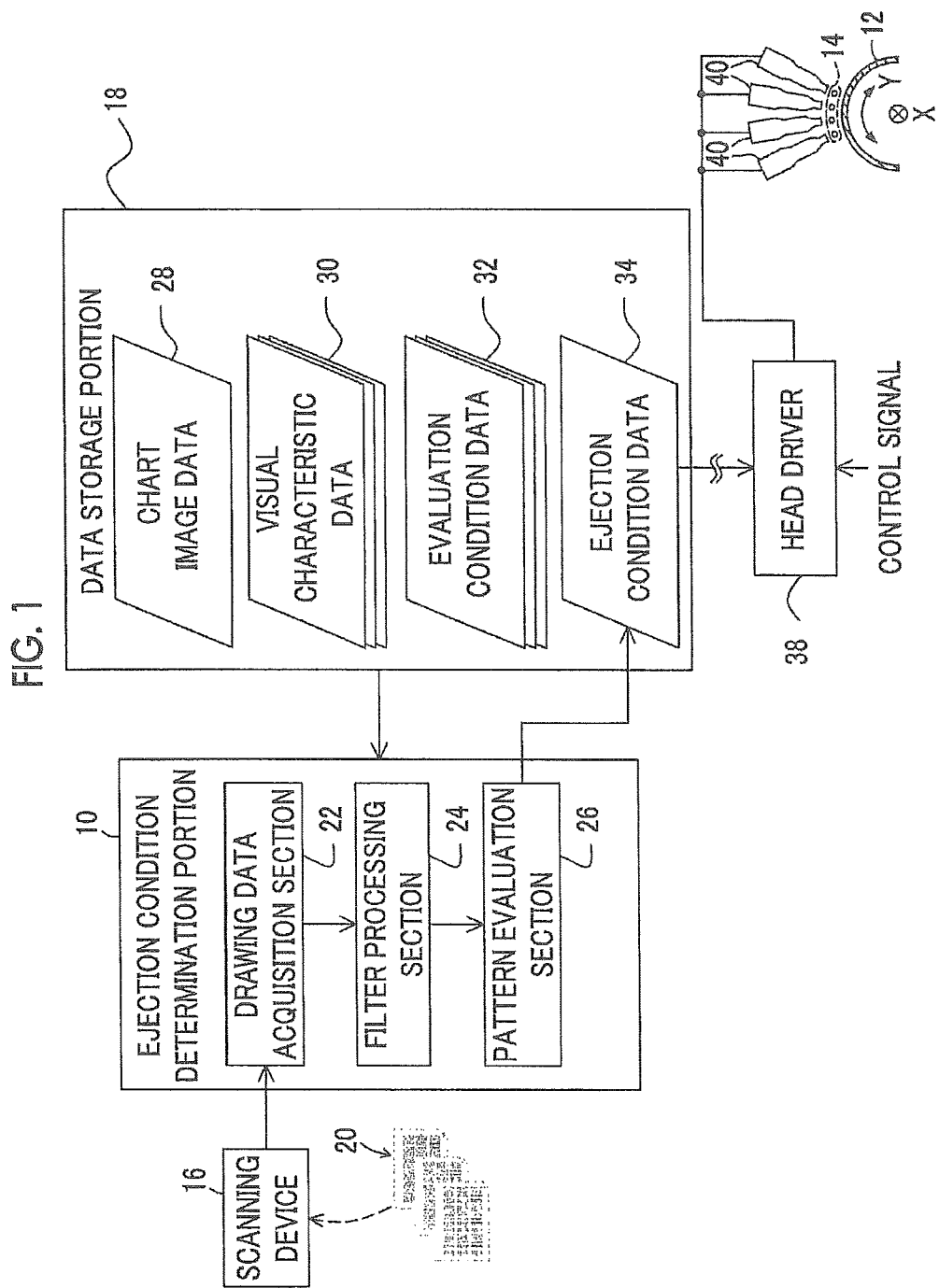

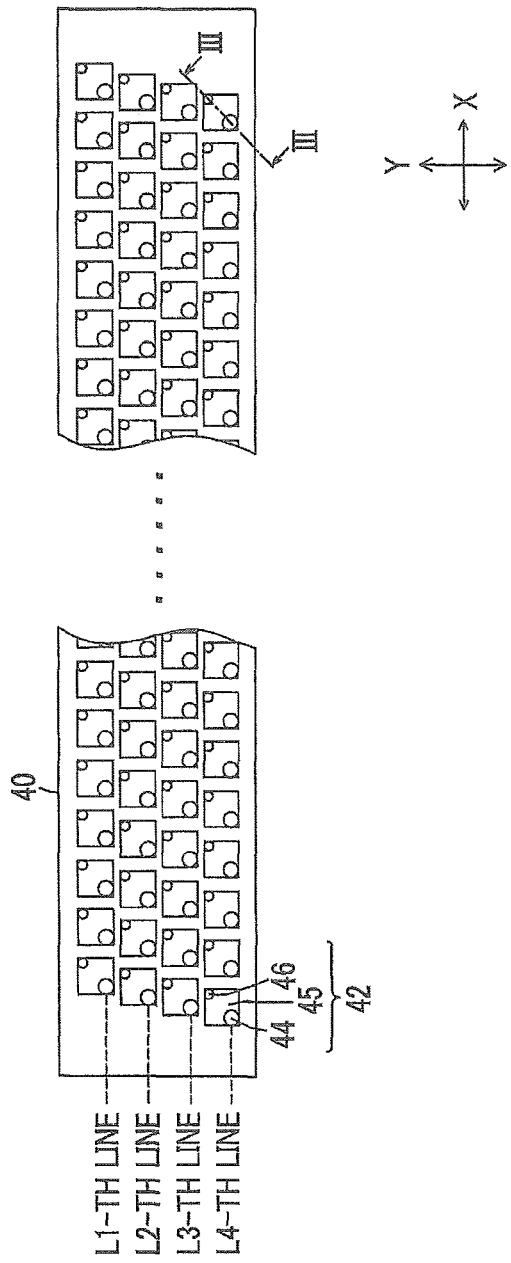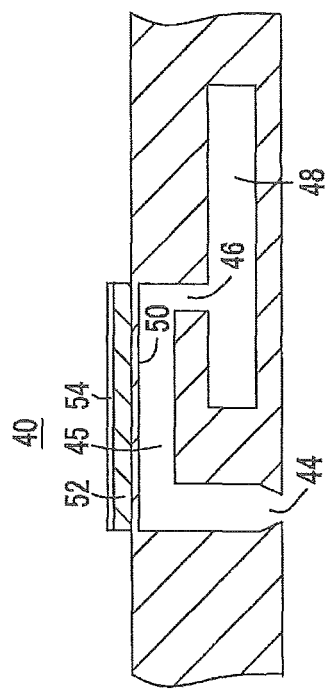

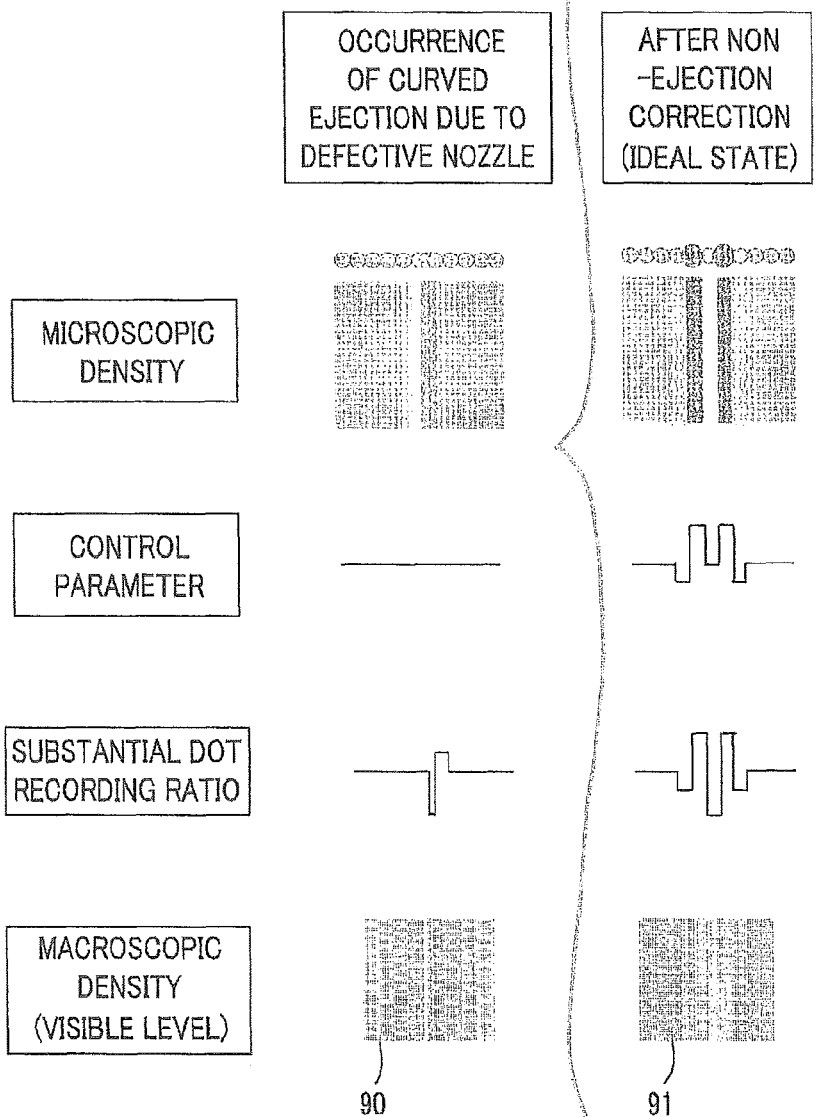

|  | FIG. 12C | FIG. 12D |
|---|---|---|
|  | AFTER NON-EJECTION CORRECTION (CURVED EJECTION OCCURS OUTWARD) | AFTER NON-EJECTION CORRECTION (CURVED EJECTION OCCURS INWARD) |
| MICROSCOPIC DENSITY | 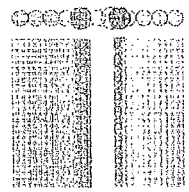 |  |
| CONTROL PARAMETER |  |  |
| SUBSTANTIAL DOT RECORDING RATIO | 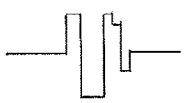 | 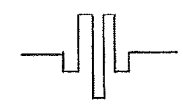 |
| MACROSCOPIC DENSITY (VISIBLE LEVEL) | \ 92 | \ 93 |

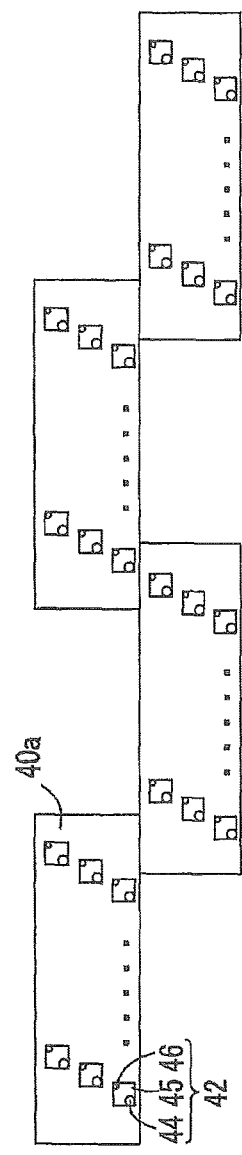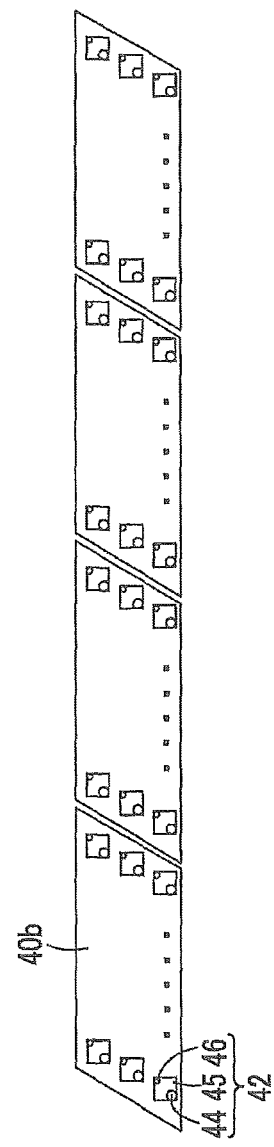

EJECTION CONDITION DETERMINATION METHOD, IMAGE FORMING METHOD, AND IMAGE FORMING APPARATUS

BACKGROUND OF THE INVENTION

1. Field of the Invention

The present invention relates to an ejection condition determination method of determining an ejection condition of droplets by relatively moving a recording medium only once with respect to a recording head including a plurality of recording elements which eject the droplets in a transport direction crossing an arrangement direction of the plurality of recording elements, so as to form an image formed by a plurality of dots on the recording medium, and an image forming method and an image forming apparatus using the ejection condition determination method.

2. Description of the Related Art

In recent years, with the rapid progress of an ink jet technique, color and large size printing in which high speed and high image quality are compatible has been realized by an ink jet recording type image forming apparatus. In this recording type, droplets of a plurality of kinds of inks (for example, CMYK inks) are ejected onto a recording medium so as to form a plurality of dots, thereby obtaining a printed matter. This kind of apparatus is used for, particularly, a wide field in application to signs and display, and is also applicable to printing of, for example, a storefront point of purchase (POP), wall poster outdoor advertising, a signboard, and the like.

In addition, in this recording type, a single pass type of using a recording head (hereinafter, referred to as a line head) including a plurality of nozzles arranged in a predetermined direction has attracted special attention. This is because an image can be formed by moving a recording medium or a line head only once in a transport direction crossing the predetermined direction, and various specifications (high speed, low power consumption, and high image quality) required in application to signs and display can be all compatible.

Meanwhile, it is most preferable that ejection states of all the nozzles included in the line head be favorable at all times in order to stably obtain high quality printed matters. However, it is realistically very difficult to secure and maintain the above-described ejection states in all line heads in terms of productivity including processing accuracy, costs, and the like. Therefore, various image correction techniques for positively suppressing deterioration in image quality have been proposed on the premise that there may be a defective nozzle in the line head.

JP2011-201121A (Abstract, and FIGS. 3 and 17) has proposed a method and an apparatus in which a correction coefficient for non-ejection correction is determined in view of the fact that patterns of landing interference occurrence are different depending on relative positional relationships between respective nozzles. JP2011-201121A also describes a drawing example of a test chart which is a set of patches formed with various ejection conditions.

JP2006-076086A (claim 2 and FIG. 12) and JP2007-160748A (claim 1, paragraph [0069], and the like) have proposed a method and an apparatus in which density reduction due to non-ejection from a defective nozzle is compensated for using N (where N is an integer of 2 or more) nozzles around the defective nozzle. Particularly, JP2006-076086A (claim 2 and FIG. 12) specifically discloses addition and subtraction of a correction amount becoming smaller as the distance from the defective nozzle increases being repeated alternately for each pixel.

SUMMARY OF THE INVENTION

However, in a case where the correction disclosed in JP2011-201121A, JP2006-076086A, and JP2007-160748A is performed in practice, there are various kinds and values of controllable parameters (hereinafter, referred to as control parameters) such as the number of nozzles used for the correction, an ejection amount of droplets, the number of color plates, and grayscale levels. In other words, there are cases where correction accuracy of image density is improved, whereas a large number of operation steps are required to select an optimal ejection condition. Therefore, as disclosed in paragraph [0006] of JP2007-160748A, a configuration is considered in which an image density of a test pattern is optically read using a scanning device, and each control parameter is automatically determined from the obtained digital data.

However, according to the result of earnest research of the present inventors, it was found that even if each control parameter is determined using the above-described method, the control parameter tends not to necessarily conform to a user's sense (checking result through visual observation). Particularly, in relation to a correction amount exemplified in JP2006-076086A, there are cases where density unevenness (relatively thin stripe unevenness due to non-ejection of droplets or deviation of landed positions) in a high spatial frequency band can be reduced, but rather density unevenness in a low spatial frequency band caused by a nozzle of which a control parameter is adjusted becomes obvious, and thus it is difficult to perform an operation of determining an optimal control parameter.

The present invention has been made in view of the above-described problems, and an object thereof is to provide an ejection condition determination method capable of considerably reducing the number of operation steps and determining an ejection condition conforming to a user's sense, and an image forming method and an image forming apparatus using the ejection condition determination method.

According to an aspect of the present invention, there is provided an ejection condition determination method in an image forming apparatus configured to relatively move a recording medium once with respect to a recording head including a plurality of recording elements configured to eject droplets in a transport direction crossing an arrangement direction of the plurality of recording elements, so as to form an image formed by a plurality of dots on the recording medium. The method includes selecting two or more kinds of ejection conditions regarding other recording elements than a specified recording element among the plurality of recording elements; acquiring drawing data representing two or more drawing patterns having different density distributions, the drawing data being acquired by respectively forming same drawing patterns using the selected two or more kinds of ejection conditions in a specified non-ejection state in which there is no ejection of the droplets from the specified recording element; performing a filter processing corresponding to human visual characteristics on the acquired drawing data so as to obtain visual correction drawing data; and determining the ejection conditions for compensating for a density variation of the image due to the specified non-ejection state based upon evaluation results which are obtained by respectively evaluating two or more drawing patterns represented by the visual correction drawing data and having been subjected to the filter processing according to a predetermined evaluation condition.

As above, since a filter processing corresponding to human visual characteristics is performed on drawing data representing two or more drawing patterns which are different in density distribution, it is possible to obtain drawing data representing a drawing form closer to a manner viewed by a user, that is, visual correction drawing data. In addition, since an ejection condition for compensating for a density variation of an image caused by a specified non-ejection state is determined based on an evaluation result obtained by respectively evaluating the two or more drawing patterns having been subjected to the filter processing according to predetermined evaluation conditions, it is possible to automatically determine an optimal ejection condition while comparing and evaluating two or more kinds of ejection conditions, respectively. Therefore, it is possible to considerably reduce the number of operation steps and to determine an ejection condition conforming to a user's sense.

In addition, in the selecting of the two or more kinds of ejection conditions, the two or more kinds of ejection conditions may be selected in which dot forming conditions for forming the dots are different for at least one of the recording elements adjacent to the specified recording element.

Further, the dot forming condition may include at least one of an ejection amount of the droplets, an ejection speed of the droplets, and a dot density.

In addition, the selecting of the two or more kinds of ejection conditions, the acquiring of the drawing data, the performing of the filter processing, and the determining of the ejection conditions may be sequentially repeatedly performed, so as to sequentially determine the dot forming condition for the recording elements and to fix the ejection conditions.

Further, the dot forming conditions for the recording elements located outside the specified recording element in a predetermined direction may be sequentially determined so as to fix the ejection conditions.

In addition, the same drawing pattern may be a flat pattern having a uniform color.

In addition, the ejection condition determination method may further include forming the two or more drawing patterns as the image on the recording medium by using the image forming apparatus, and, in the acquiring of the drawing data, the two or more formed drawing patterns may be read using a scanning device which adopted to optically read the image, so as to acquire the drawing data.

Further, in the acquiring of the drawing data, the two or more drawing patterns may be read in a reading direction which is determined according to optical transfer characteristics of the scanning device, so as to acquire the drawing data.

In addition, the ejection condition determination method may further include inputting image forming information regarding the image forming apparatus, and, in the acquiring of the drawing data, digital data simulating difference in density distribution may be created using the input image forming information, so as to acquire the drawing data.

According to another aspect of the present invention, there is provided an image forming method including forming the image by controlling ejection of the recording head in the specified non-ejection state based upon the ejection conditions determined using any one of the above-described methods.

According to still another aspect of the present invention, there is provided an image forming apparatus including the recording head of which ejection is controlled in the specified non-ejection state based upon the ejection conditions determined using any one of the above-described methods, so as to form the image.

According to the ejection condition determination method, the image forming method and the image forming apparatus using the ejection condition determination method related to the present invention, since a filter processing corresponding to human visual characteristics is performed on drawing data presenting two or more drawing patterns which are different in density distribution, it is possible to obtain drawing data representing a drawing form closer to a manner viewed by a user, that is, visual correction drawing data. In addition, since an ejection condition for compensating for a density variation of an image caused by a specified non-ejection state is determined based on an evaluation result obtained by respectively evaluating the two or more drawing patterns having been subjected to the filter processing according to predetermined evaluation conditions, it is possible to automatically determine an optimal ejection condition while comparing and evaluating two or more kinds of ejection conditions, respectively. Therefore, it is possible to considerably reduce the number of operation steps and to determine an ejection condition conforming to a user's sense.

BRIEF DESCRIPTION OF THE DRAWINGS

FIG. 1 is a schematic block diagram illustrating a main configuration for realizing an ejection condition determination method according to a first embodiment.

FIG. 2 is a transparent plan view illustrating a configuration example of the recording head shown in FIG. 1.

FIG. 3 is a schematic cross-sectional view taken along the line in FIG. 2.

FIGS. 12A-12D are the schematic explanatory diagram regarding an effect of non-ejection correction.

FIGS. 17A and 17B are transparent plan views illustrating other configuration examples of the recording head shown in FIG. 1.

DESCRIPTION OF THE PREFERRED EMBODIMENTS

Figure 4:
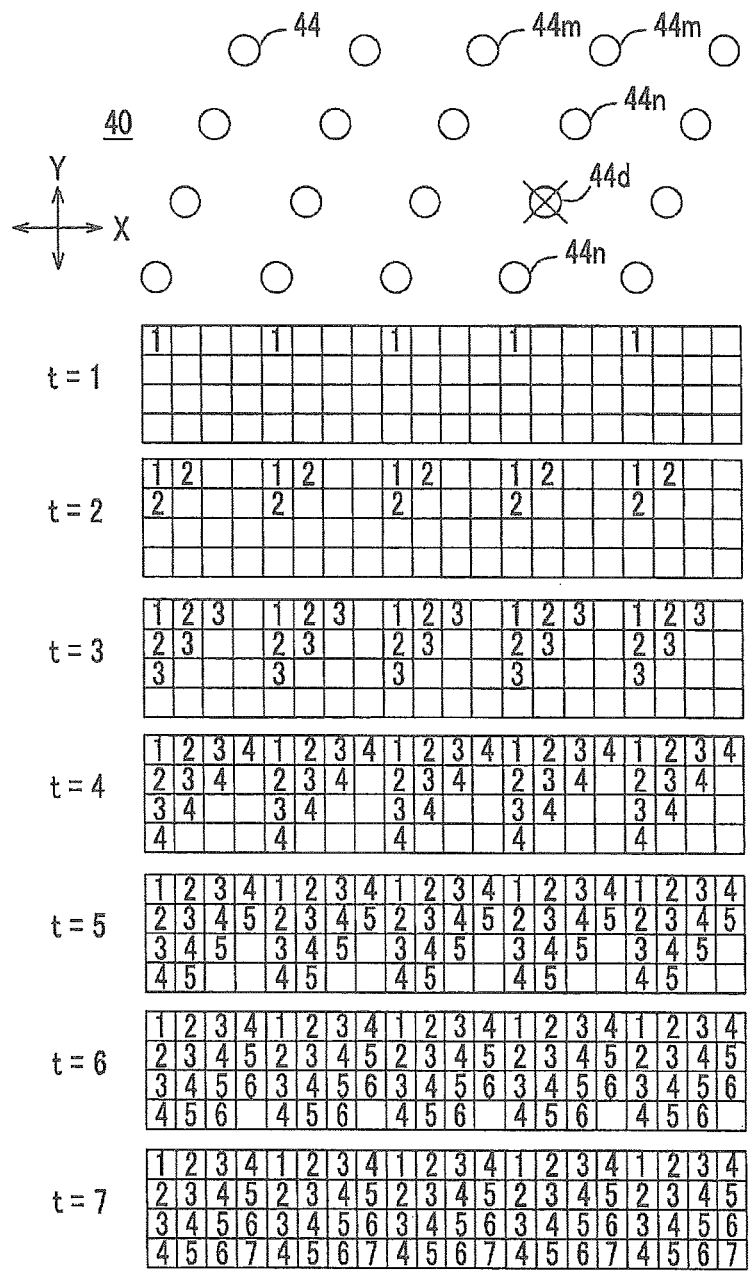
FIG. 4 is a schematic explanatory diagram illustrating a correspondence relationship between an arrangement example of a plurality of nozzles and an ejection order on a sheet.

Hereinafter, an ejection condition determination method according to the present invention will be described in detail using preferred embodiments in a relationship with an image forming method and an image forming apparatus which performs the method. In this specification, to form an image is referred to as "printing" in some cases.

Configuration According to First Embodiment

Schematic Block Diagram

FIG. 1 is a schematic block diagram illustrating a main configuration for realizing an ejection condition determination method according to a first embodiment.

An ejection condition determination portion 10, which is a core of the embodiment of the present invention, determines an ejection condition of droplets 14 in an image forming apparatus 100 (refer to FIGS. 15 and 16) which forms a color image or a monochrome image formed by a plurality of dots on a sheet 12 (recording medium). In addition, the ejection condition determination portion 10 is capable of sending and receiving a variety of data to and from a scanning device 16 and a data storage portion 18.

The ejection condition determination portion 10 includes a drawing data acquisition section 22, a filter processing section 24, and a pattern evaluation section 26. The drawing data acquisition section 22 acquires drawing data representing an image adjusting chart 20 (refer to FIGS. 1 and 7A) described later. The filter processing section 24 performs a filter processing corresponding to human visual characteristics on the drawing data. The pattern evaluation section 26 evaluates a flat pattern 70 (refer to FIG. 7B) according to a predetermined evaluation condition.

The scanning device 16 optically reads an image on a printed matter including the image adjusting chart 20 so as to generate digital data. The scanning device 16 may be a flat scanner provided for reading a reflected original document, or may be a film scanner provided for reading a transmitted original document.

The data storage portion 18 stores a variety of data required to perform this determination method. In this drawing example, the data storage portion stores chart image data 28, a plurality of kinds of visual characteristic data items 30, a plurality of kinds of evaluation condition data items 32, and ejection condition data 34.

A head driver 38 is a driving circuit which controls driving of four recording heads 40 based on a control signal provided for forming an image so as to eject the droplets 14 at appropriate timing. Here, a single pass type is shown in which the sheet 12 is transported only once in the arrow Y direction crossing (perpendicular to) the arrow X direction in a state of fixing each recording head 40 which is a line head extending in the arrow X direction.

Configuration of Recording Head 40

FIG. 2 is a transparent plan view illustrating a structure example of the recording head 40 shown in FIG. 1. FIG. 3 is a schematic cross-sectional view taken along the line of FIG. 2.

As shown in FIG. 2, the recording head 40 includes a plurality of ink chamber units 42 (recording elements) which are arranged in a zigzag matrix. Each ink chamber unit 42 includes a nozzle 44, a pressure chamber 45, and a supply port 46. In the pressure chamber 45 which has a substantially rectangular planar shape, an outflow port to the nozzle 44 side is provided at one corner of both corners disposed diagonally, and an inflow port (the supply port 46) from a common channel 48 is provided at the other corner thereof.

As shown in FIG. 3, each pressure chamber 45 communicates with the common channel 48 via the supply port 46. In addition, the common channel 48 communicates with an ink tank (not shown) which is a supply source of an ink (color material). Thus, the ink supplied from the ink tank is distributed and supplied to each pressure chamber 45 via the common channel 48.

One surface (corresponding to an upper surface in the example of FIG. 3) of the pressure chamber 45 is constituted by a pressing plate 50, and the pressing plate 50 is also used as a common electrode. A piezoelectric element 52 which is an actuator giving pressure to the pressing plate 50 so as to be deformed is joined onto the pressing plate 50. In addition, an individual electrode 54 is formed on the upper surface of the piezoelectric element 52.

When a driving voltage is applied between two electrodes, that is, the pressing plate 50 which is a common electrode and the individual electrode 54, the piezoelectric element 52 interposed between the two electrodes is deformed. This physical deformation causes a volume of the pressure chamber 45 to vary, and thus the ink is pushed outward from the nozzle 44 and is ejected as the droplets 14 (refer to FIG. 1). In addition, after the droplets 14 are ejected, an ink refills the pressure chamber 45 via the supply port 46 from the common channel 48 when the displacement of the piezoelectric element 52 returns to an original state.

Referring to FIG. 2 again, an arrangement feature of the nozzles 44 will be described. In FIG. 2, a longitudinal direction and a transverse direction of the recording head 40 are respectively defined as an arrow X direction and an arrow Y direction. In this case, a transport direction (refer to FIG. 1) of the sheet 12 is perpendicular to the arrow X direction and is parallel to the arrow Y direction.

The respective nozzles 44 in the L1-th line are disposed at the same interval with a predetermined gap (corresponding to four unit lengths) in the arrow X direction. The respective nozzles in the L2-th to L4-th lines are also disposed in the same manner as in the L1-th line. Hereinafter, the arrow X direction is referred to as an "arrangement direction" of the nozzles 44 (the ink chamber units 42) in some cases.

Each nozzle 44 in the L2-th line is disposed at a position which is shifted by one unit length to the left in the arrow X direction from the position of each nozzle 44 in the L1-th line. Each nozzle 44 in the L3-th line is disposed at a position which is shifted by one unit length to the left in the arrow X direction from the position of each nozzle 44 in the L2-th line. Each nozzle 44 in the L4-th line is disposed at a position which is shifted by one unit length to the left in the arrow X direction from the position of each nozzle 44 in the L3-th line. Therefore, an actual gap (projected nozzle pitch) between the nozzles 44 projected so as to be arranged in the longitudinal direction of the recording head 40 becomes small for high density.

FIG. 4 is a schematic explanatory diagram illustrating a correspondence relationship between a first arrangement example of a plurality of nozzles 44 included in the recording head 40 and an ejection order onto the sheet 12. For convenience of description, a case of using twenty nozzles 44 will be described as an example.

Each cell in the rectangular lattice shown in FIG. 4 indicates a region of one pixel in a formed image. The blank cell indicates an image position where the droplets 14 (refer to FIG. 1) are not ejected (landed) yet at each ejection time point (t). In addition, the arabic numeral shown in the cell corresponds to a time point (ejection time points t=1 to 7) when the droplets 14 are ejected at the image position thereof.

For example, a plurality of dots are sequentially formed by the droplets 14 ejected between the ejection time points t=1 and 4, so as to generate a first image line. In addition, a plurality of dots are sequentially formed by the droplets 14 ejected between the ejection time points t=4 and 7, so as to generate a fourth image line. In other words, dots are sequentially formed at a plurality of (four in FIG. 4) timings so as to generate (complete) each image line.

Operation of Ejection Condition Determination Portion 10

Next, an operation of the ejection condition determination portion 10 shown in FIG. 1 will be described in detail with appropriate reference to a flowchart of FIG. 5 and other drawings.

In step S1, at least one nozzle 44 (a so-called defective nozzle) in which an ejection operation of the droplets 14 is not favorable is specified among a plurality of nozzles 44 included in the recording head 40.

Figure 6:
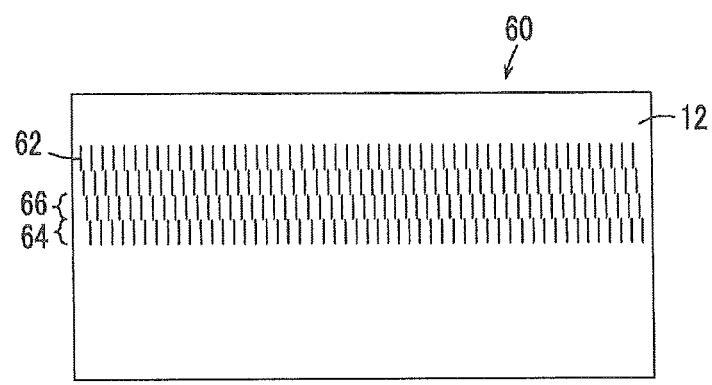
FIG. 6 is a schematic plan view illustrating an example of a defective nozzle specifying chart.

FIG. 6 is a schematic plan view illustrating an example of a nozzle specifying chart 60. As shown in FIG. 6, a plurality of line images 62 parallel to the arrow Y direction are formed on the nozzle specifying chart 60. In order to clarify a relationship between each nozzle 44 and each line image 62, a method of forming the nozzle specifying chart 60 will be described below.

First, the droplets 14 are ejected from the respective nozzles 44 at intervals of three among the nozzles 44 belonging to the L1-th line, so as to form a line image group 64 of one row. Next, the droplets 14 are ejected from other nozzles 44, for example, respective nozzles 44 adjacent rightward to the initially used nozzles 44, so as to form a line image group 66 of one row. When this operation is sequentially performed four times, the line images 62 formed by only the nozzles 44 belonging to the L1-th line are disposed in the number corresponding to the number of the nozzles 44 belonging to the L1-th line on the sheet 12.

As above, it is possible to check an ejection operation of each nozzle 44 on the nozzle specifying chart 60 by respectively forming the line images 62 using the respective nozzles 44 of the L2-th to L4-th lines in the same manner as in the L1-th line. For example, in a case where no line image 62 is formed, a nozzle 44 corresponding to the line image 62 is specified not to eject the droplets 14. In addition, in a case where the line image 62 is relatively tilted, a nozzle 44 corresponding to the line image 62 is specified to cause curved ejection (i.e., abnormal meniscus).

The nozzle specifying chart 60 may be checked through visual observation, and then identification information of a specified nozzle 44d may be input through a manual operation. Alternatively, the nozzle specifying chart 60 may be read using an image reading mechanism embedded in the image forming apparatus 100 (refer to FIG. 15) while printing the nozzle specifying chart, and then a specified nozzle 44d may be automatically detected thereby identification information of the automatically detected nozzle may be input.

In addition, in subsequent steps S2 to S10, an ejection condition of the other nozzles 44 is determined so as to perform non-ejection correction of the nozzle 44 (hereinafter, a specified nozzle 44d; refer to FIG. 4) specified in step S1. Here, the "non-ejection correction" indicates an image correction technique of stopping an ejection operation of the specified nozzle 44d in which an ejection operation of the droplets 14 is not normal and compensating for a density variation (mainly, a density reduction) of an image due to this stopping.

In step S2, two or more kinds of ejection conditions regarding the other nozzles 44 than the specified nozzle 44d are selected. Here, the ejection condition indicates a set of combinations of kinds and values of control parameters regarding ejection control of each nozzle 44. The ejection condition includes, for example, position information of the nozzle 44, identification information (identification number, the number of continuous nozzles, or the like) of the specified nozzle 44d, dot forming conditions, grayscale level info nation (halftone %), color information (the kind of color plate, or the like), and combinations thereof. The position information of the nozzle 44 may include, for example, a relative position to the specified nozzle 44d, a pitch of the nozzles 44, a positional relationship in the recording head 40 (for example, attributes of the L1-th to L4-th lines shown in FIG. 2), and the like. The dot forming conditions are various conditions for forming dots through ejection of the droplets 14, and include, for example, at least one of an ejection amount of the droplets 14, an ejection rate thereof, and a dot density (so-called recording density).

In this embodiment, ejection conditions in which dot forming conditions for nozzles in a vicinity of the specified nozzle 44d, for example, at least one of (for example, four) nozzles 44 adjacent thereto are different are selected, respectively.

Figure 15:
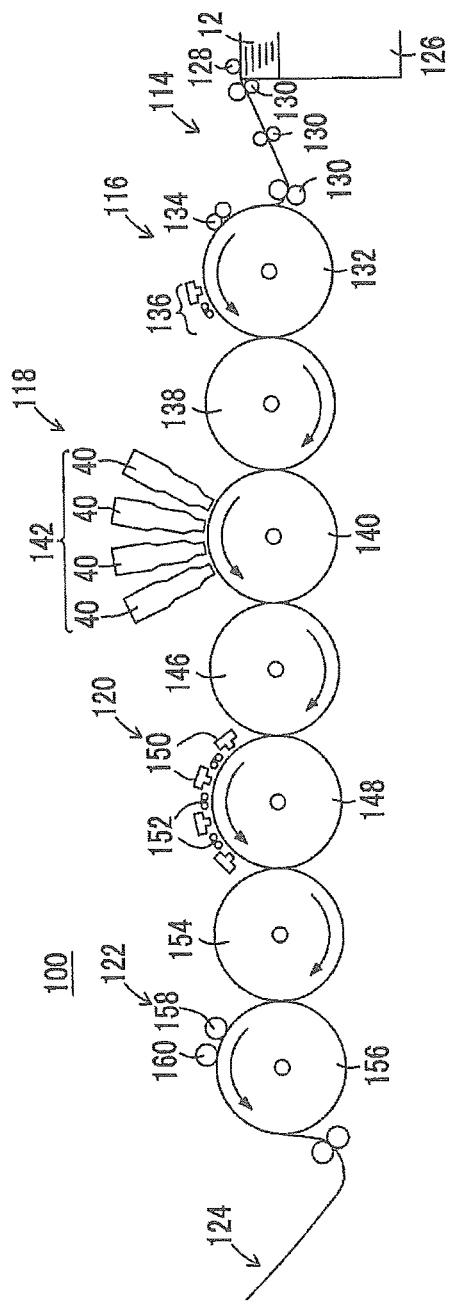
FIG. 15 is a cross-sectional side view illustrating a configuration of an image forming apparatus.

In step S3, the image adjusting chart 20 on which the respective ejection conditions selected in step S2 are reflected is printed using the image forming apparatus 100 (refer to FIG. 15). Specifically, the head driver 38 acquires the chart image data 28 stored in the data storage portion 18, and then controls driving of each recording head 40 so as to obtain the image adjusting chart 20.

Figure 7A:
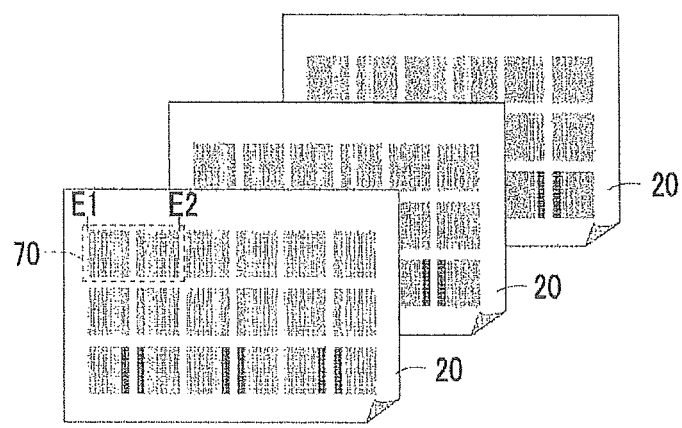
FIG. 7A is a schematic plan view illustrating an example of an image adjusting chart.

As shown in FIG. 7A, a plurality of flat patterns 70 (drawing patterns) having uniform colors (for example, the substantially same light reflectance, luminance and density), nine patterns in the example of FIG. 7A are drawn in each image adjusting chart 20. Each flat pattern 70 may be obtained by forming the same drawing pattern (here, an image with the same pixel value) by using each ejection condition determined in step S2 in a state in which the droplets 14 are not ejected from the specified nozzle 44d (hereinafter, a specified non-ejection state). For this reason, the respective flat patterns 70 macroscopically have the approximately same density but microscopically have different density distributions.

In addition, in the present specification, a two-dimensional distribution of a color of an image is referred to as a "density distribution", but an index for indicating a color of an image is not limited to an "optical density". In other words, all indexes (for example, light reflectance, luminance, luminosity, and the like) indicating a color of an image may be employed as a two-dimensional distribution.

In the example of FIG. 7A, a dot gain of nozzles 44 (hereinafter, the nearest adjacent nozzles 44n; refer to FIG. 4) closest to the specified nozzle 44d from the lower side to the upper side increases in the same image adjusting chart 20. In addition, a dot gain of nozzles (hereinafter, the second nearest adjacent nozzles 44m; refer to FIG. 4) which are the second closest from left to right increases.

Figure 7B:
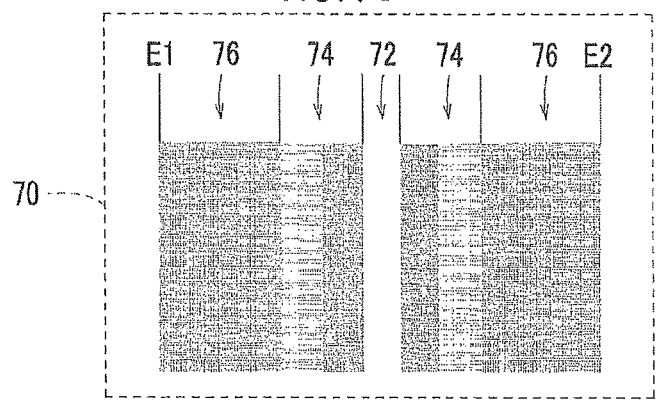
FIG. 7B is an enlarged view of a flat pattern.

As shown in FIG. 7B, the flat pattern 70 includes a non-ejection region 72 which is an image region corresponding to a position of the specified nozzle 44d, adjustment target regions 74 which are image regions corresponding to positions of the nearest adjacent nozzles 44n and the second nearest adjacent nozzles 44m, and non-adjustment target regions 76 which are image regions corresponding to positions of the other nozzles 44. Here, the "image region corresponding to a position of the nozzle 44" mainly indicates an image region in which a color is formed on the recording medium 12 through ejection of the droplets 14 from the corresponding nozzle 44. Particularly, the non-adjustment target region 76 is used as a reference image so as to clarify adjustment targets of the image in the non-ejection region 72 and the adjustment target region 74.

In addition, the specified non-ejection state may be realized by setting a control signal value corresponding to an ejection position of the specified nozzle 44d to 0, or the specified non-ejection state may be realized by directly giving a non-ejection command to the head driver 38.

Further, a form of a drawing pattern forming the image adjusting chart 20 may employ a geometric pattern such as a stripe, a circle, a dot, or a mark other than the flat pattern. Particularly, it is more preferable to use the flat pattern 70 in which an image quality difference is most easily detected.

Further, in the example of FIG. 7A, for easy discrimination, the respective flat patterns 70 are disposed spaced apart from each other with a specific gap in the image adjusting chart 20. A form of the flat pattern is not limited thereto, and, for example, the flat pattern may be an integrated pattern without a space. In this case, it is normally difficult to differentiate ejection condition differences from each other on an image, and thus a variety of information with which a position of each drawing pattern is specified is preferably held in advance.

In step S4, the drawing data acquisition section 22 acquires drawing data representing the image adjusting chart 20 formed in step S3. Before the acquisition, the scanning device 16 optically reads the image of the image adjusting chart 20 (including the nine flat patterns 70) so as to be supplied to the ejection condition determination portion 10 side. Further, the drawing data acquisition section 22 acquires the obtained digital data (device-dependent data such as RGB, and optical physical quantities such as reflectance and transmittance) as drawing data without modification, or converts the digital data into device-independent data such as L*a*b.

Here, an image reading direction may be determined based on an optical transfer function (OTF) of the scanning device 16. Specifically, an axis direction with higher OTF of two axis directions of an image reading region is made to match a horizontal direction (the arrangement direction of the nozzles 44; the X direction) of the image adjusting chart 20 shown in FIG. 7A, and thus it is possible to suppress influence of sharpness decrease caused by the scanning device 16.

In step S5, the ejection condition determination portion 10 selects one data item from each of a plurality of visual characteristic data items 30 and a plurality of evaluation condition data items 32. For example, the data item may be selected depending on the kind of image adjusting chart 20 or may be selected by receiving an input operation by a user.

In step S6, the filter processing section 24 performs a filter processing in which one visual characteristic data item 30 selected in step S5 has acted on the drawing data acquired in step S4. Here, the "filter processing" indicates an image process of modulating a spatial frequency component (spectral intensity) of an image.

Figure 8:
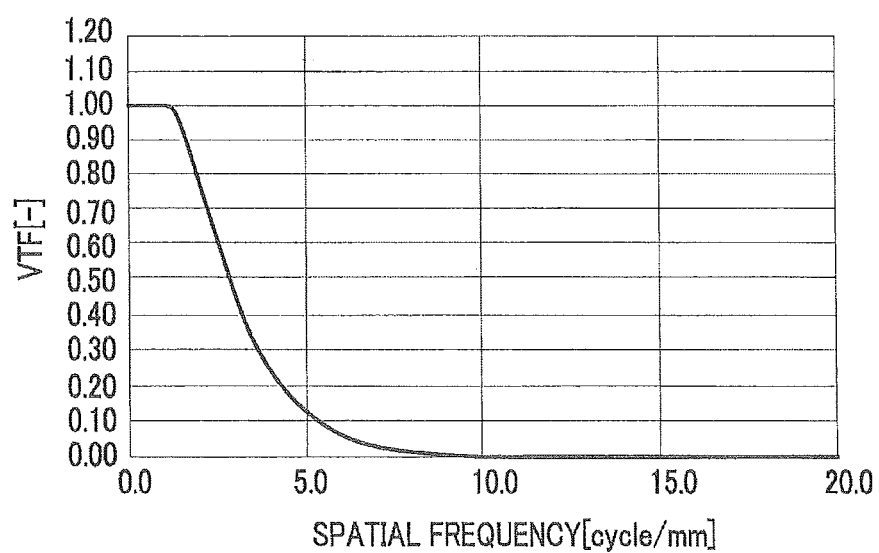
FIG. 8 is a graph of a Dooley-Shaw function (observation distance 300 mm).

FIG. 8 is a graph of a Dooley-Shaw function (observation distance 300 mm). This function is a kind of visual transfer function (VTF) and is a representative function which models human standard visual response characteristics. Specifically, the function corresponds to the square value of contrast ratio characteristics of luminance. The transverse axis of the graph expresses a spatial frequency (the unit: cycle/mm), and the longitudinal axis expresses a value (the unit is dimensionless) of the VTF.

The filter processing section 24 performs inverse Fourier transform (for example, IFFT) on the square root of the VTF shown in FIG. 8 so as to calculate a mask on the real space corresponding to the VTF in advance. Then, the filter processing section 24 performs a convolution operation on the drawing data acquired from the drawing data acquisition section 22 by using a mask corresponding to a resolution thereof. Thus, it is possible to obtain visual correction drawing data.

In addition, a function shape of visual characteristics is not limited thereto, and various visual characteristics derived from mathematical models, test data, or the like may be employed. Further, an observation distance may not only correspond to 300 mm but be also variously changed depending on observation aspects or evaluation references of an image, or the like.

In addition, in order to appropriately reflect a correction effect through the above-described filter processing, a pixel value of drawing data is preferably converted into an (preferably, linear) amount with high correlation with an amount of light reflected by or transmitted through an image. As an example thereof, RGB values, tristimulus values (XYZ), light reflectance in a case of a reflection original document, light transmittance in a case of a transmission original document, or the like may be used.

In step S7, the pattern evaluation section 26 evaluates two or more flat patterns 70 which have been subjected to the filter processing according to the evaluation condition data items 32 selected in step S5. Hereinafter, a specific example of the evaluation will be described in detail.

Figure 9A:
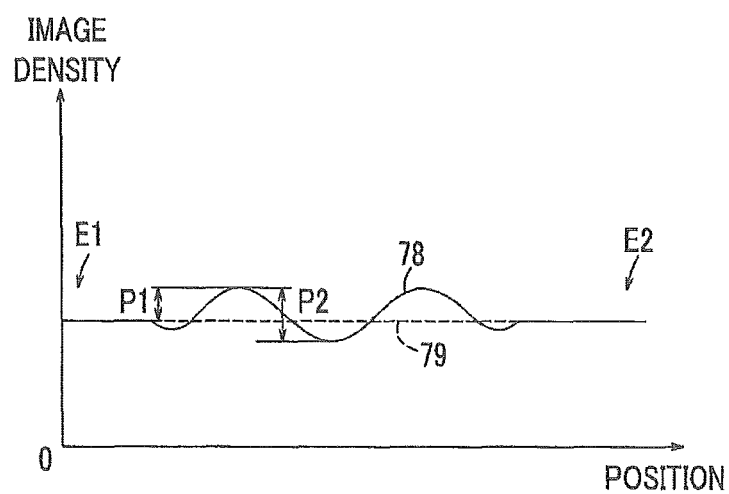
FIGS. 9A and 9B are schematic explanatory diagrams regarding an evaluation method of a flat pattern.
Figure 9B:
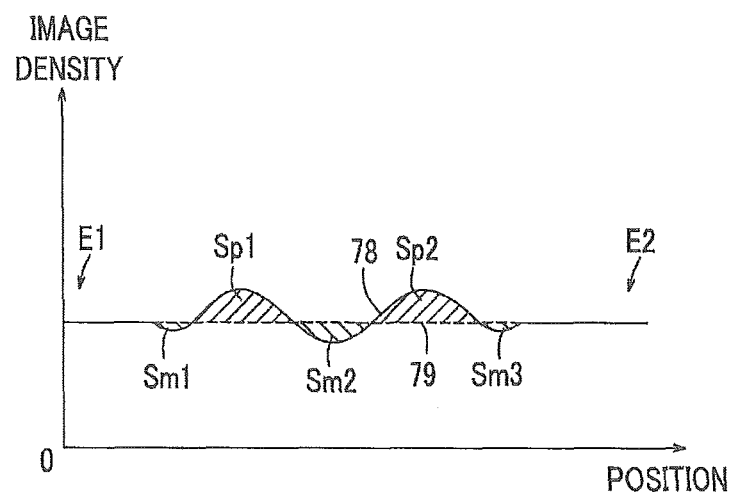

FIGS. 9A and 9B are schematic explanatory diagrams regarding an evaluation method of the flat pattern 70. A profile 78 common to both of FIGS. 9A and 9B indicates a microscopic density distribution from one end E1 to the other end E2 (refer to FIGS. 7A and 7B) of the flat pattern 70. The profile 78 has two peaks indicating maximum points of an image density and three peaks indicating minimum points of the image density. In addition, an ideal line 79 indicated by the broken line in FIGS. 9A and 9B corresponds to an average density (an ideal density) at a position which is sufficiently spaced apart from the specified nozzle 44*d*.

The pattern evaluation section 26 may evaluate each flat pattern 70 by placing importance on an extent in which stripe unevenness occurs. As shown in FIG. 9A, a difference P1 between the maximum value and an ideal density may be an evaluation value, or a difference P2 between the maximum value and the minimum value of the image density may be an evaluation value. In this case, the smaller the difference P1 or P2, the higher an evaluation, and, the larger the difference P1 or P2, the lower an evaluation.

The pattern evaluation section 26 may evaluate each flat pattern 70 by placing importance on macroscopic reproducibility of an image density. As shown in FIG. 9B, when, with respect to the ideal lines 79, the areas of two regions on the upper side are respectively indicated by Sp1 and Sp2, and the areas of three regions on the lower side are respectively Sm1, Sm2, and Sm3, the integral $St=|(Sp1+Sp2)-(Sm1+Sm2+Sm3)|$ may be an evaluation value. In this case, the smaller the integral St, the higher an evaluation, and, the larger the integral St, the lower an evaluation.

In addition, a method of calculating an evaluation value is not limited thereto, and various methods or indexes appropriate for quantification of density unevenness of an evaluation target, and combinations thereof, may be used. As an example of an evaluation method, in addition to the above-described statistical process, well-known image processing methods including a feature amount extraction process may be performed. Specifically, a low-pass filter may be applied in a case of evaluating strip unevenness having a component of a low spatial frequency band, and a high-pass filter or an edge detection filter may be applied in a case of evaluating stripe unevenness having a component of a high spatial frequency band. In addition, this process may be performed separately from/together with the above-described filter processing (step S6).

Further, from the viewpoint of an averaged error, a longitudinal axis of the profile 78 is preferably converted into an (preferably, linear) amount with high correlation with an amount of light reflected by or transmitted through an image. As an example thereof, RGB values, tristimulus values (XYZ), light reflectance in a case of a reflection original document, light transmittance in a case of a transmission original document, or the like may be used.

In step S8, the ejection condition determination portion 10 discriminates whether or not to finish this evaluation based on the evaluation result obtained in step S7. The ejection condition determination portion 10 discriminates whether or not there is at least one flat pattern 70 which satisfies an evaluation reference capable of realizing image quality of an allowable level. If it is discriminated that there is no flat pattern, the flow returns to step S2, and a different ejection condition different from in the previous time is selected again, and steps S2 to S8 are sequentially repeatedly performed. On the other hand, if it is discriminated that there is at least one flat pattern, the flow proceeds to the next step (S9). In addition, the flow may proceed to the next step (S9) without performing the discrimination process.

In step S9, the ejection condition determination portion 10 determines an optimal ejection condition on the basis of the evaluation result obtained in step S7. For example, the ejection condition determination portion 10 may determine an ejection condition having the highest evaluation result among a plurality of ejection conditions as an optimal ejection condition. Alternatively, the ejection condition determination portion 10 may estimate an evaluation value in an intermediate ejection condition from a relationship between a plurality of ejection conditions and evaluation values, and may determine an ejection condition which is expected to obtain the highest evaluation result as an optimal ejection condition.

In step S10, the optimal ejection condition determined in step S9 is set and is preserved. Specifically, the ejection condition determination portion 10 sends data regarding the optimal ejection condition so as to be stored in the data storage portion 18.

In this way, an operation of the ejection condition determination portion 10 is completed. An optimal ejection condition in which a plurality of control parameters are variously combined may be determined by repeatedly performing the flowchart of FIG. 5 as necessary.

For example, there are cases where it is difficult to perform an operation of determining an optimal control parameter when an image is adjusted using nozzles 44 around the specified nozzle 44*d*, the nearest adjacent nozzles 44*n*, the second nearest adjacent nozzles 44*m*, and the other nozzles 44. Specifically, even if density unevenness (a relatively thin stripe unevenness due to non-ejection or landing position deviation of the droplets 14) of a high spatial frequency band is reduced as a result of image adjustment, density unevenness of a low spatial frequency band caused by the nozzle 44 for which a control parameter is adjusted may become more obvious. Similarly, as a result of suppressing density unevenness of a low spatial frequency band, density unevenness of a high spatial frequency band may become more obvious.

Figure 5:
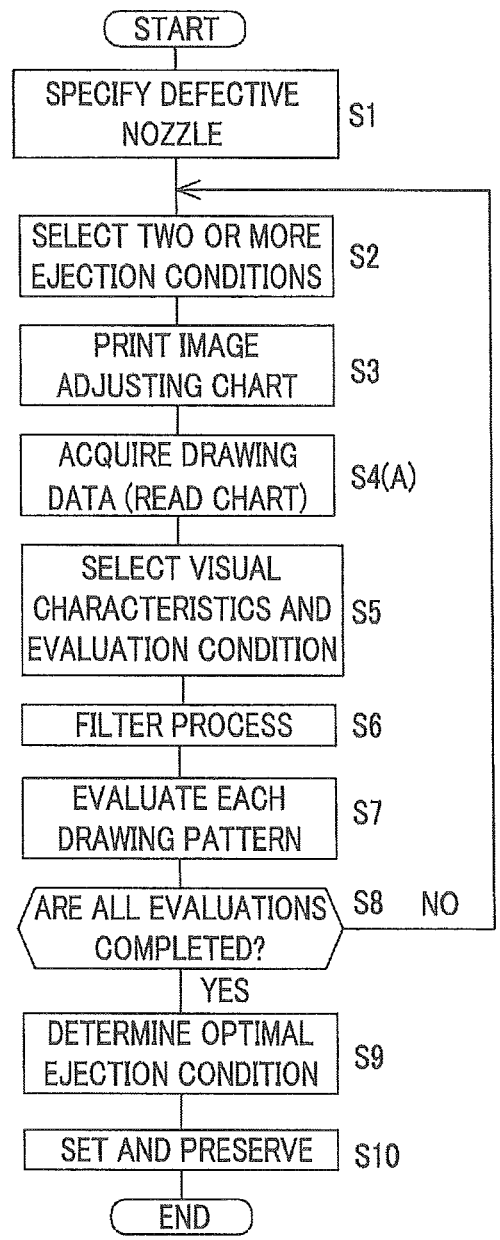
FIG. 5 is a flowchart provided for description of an operation of the ejection condition determination portion of FIG. 1.

Therefore, a method may be employed in which a dot forming condition for each nozzle 44 is sequentially determined through sequential repetition of steps S2 to S9 of FIG. 5, and then a final ejection condition is fixed. Particularly, an ejection condition is preferably sequentially determined for the nozzles 44 located on the outside in a predetermined direction (for example, an arrangement direction) from the specified nozzle 44*d*.

Figure 10A:
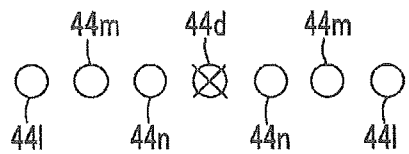
FIGS. 10A to 10D are schematic explanatory diagrams illustrating a determination process of a dot gain control parameter.
Figure 10B:
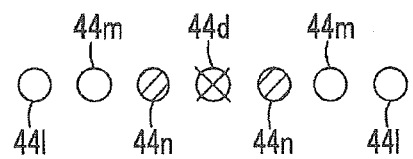
Figure 10C:
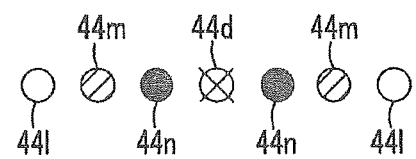
Figure 10D:
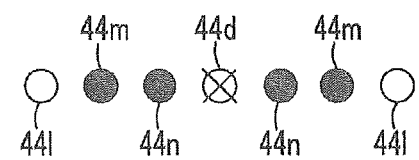

FIGS. 10A to 10D are schematic explanatory diagrams illustrating a determination process of a dot gain control parameter. FIG. 10A shows the nearest adjacent nozzles 44*n*, the second nearest adjacent nozzles 44*m*, and the third nearest adjacent nozzles 44*l* in an order of being close to the specified nozzle 44*d*. For convenience of description, a state is shown in which seven nozzles 44 are disposed in a line. In addition, FIGS. 10B to 10D are the same as FIG. 10A.

The circle with X indicates the specified nozzle 44*d*. In addition, the normal circle indicates a nozzle 44 of which a dot gain control parameter is a default value and a dot gain is not adjusted. Further, the hatched circle indicates a nozzle 44 of which a value of a dot gain control parameter is variously changed. Furthermore, the filled circle indicates a nozzle 44 of which a value of a dot gain control parameter is fixed.

In the first image adjustment, two or more kinds of ejection conditions in which values of the dot gain control parameters of the two nearest adjacent nozzles 44*n* and 44*n* are variously changed are selected, and one kind of ejection condition thereof is determined (refer to FIG. 10B). Here, the dot gain control parameters of the two second nearest adjacent nozzles 44*m* and 44*m* and the two third nearest adjacent nozzles 44*l* and 44*l* are respectively set to default values.

In the second image adjustment, after a value of the dot gain control parameter of each of the nearest adjacent nozzles 44*n* and 44*n* is fixed, two or more kinds of ejection conditions in which values of the dot gain control parameters of the second nearest adjacent nozzles 44*n* and 44*n* are variously changed are selected, and one kind of ejection condition is determined from the conditions (refer to FIG. 10C).

Next, if it is determined that image quality is in an allowable level, a value of the dot gain control parameter of each of the second nearest adjacent nozzles 44*m* and 44*m* is fixed (refer to FIG. 10D). As such, the number of nozzles 44 which is a control parameter is reduced so as to narrow options, thereby improving efficiency of the adjustment operation. In addition, a dot forming condition is sequentially determined in an order in which an adjustment amount (a variation amount from a reference value) of a dot gain is large, and thus an image adjustment performance is rapidly improved.

On the other hand, conversely to the above description, if sequential determination is performed from the outside of the specified nozzle 44*d* to the inside in a predetermined direction (for example, an arrangement direction), this is not efficient from the viewpoint of image adjustment since a dot forming condition is determined in an order in which an adjustment amount of a dot gain is small.

In addition, although values of control parameters are determined independently from each other in the above-described example, values of control parameters may be determined under any constraints. An example of the constraint may include an upper limit of a total amount of ink to be used, an operation range of a control parameter, or the like.

Figure 11:
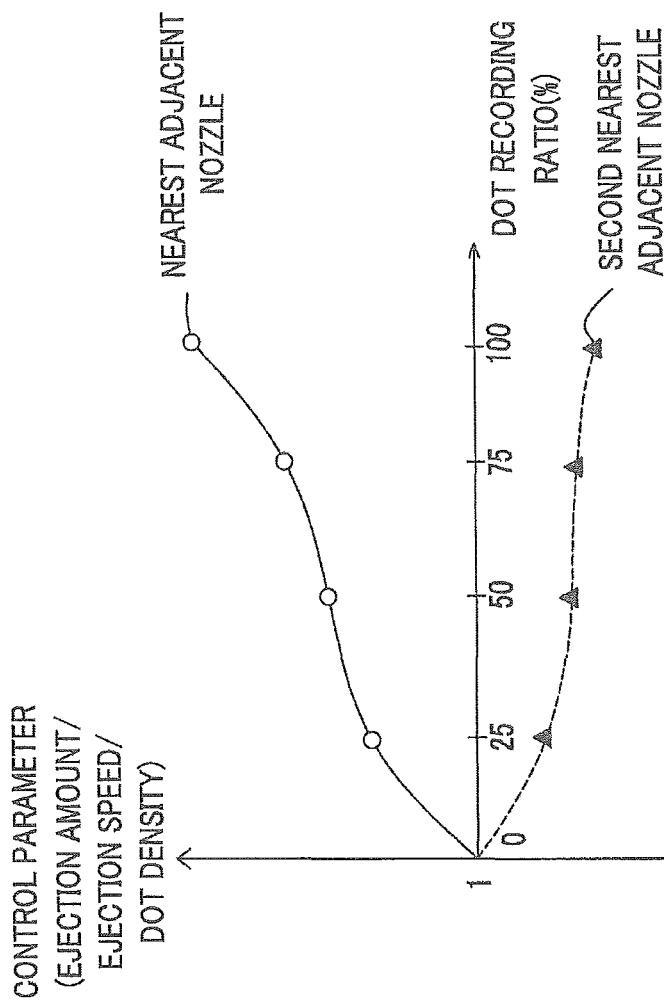
FIG. 11 is a graph illustrating a determination example of a dot gain control parameter of the nearest adjacent nozzle and the second nearest adjacent nozzle.

FIG. 11 is a graph illustrating an example of determining control parameters of the nearest adjacent nozzles 44*n* and the second nearest adjacent nozzles 44*m*, and shows an example (look-up table) of a data format in the ejection condition data 34 (refer to FIG. 1). The transverse axis of this graph expresses a dot recording ratio (unit: %), and the longitudinal axis thereof expresses a control parameter. In addition, the control parameter has a standard value of 1, is a variable which is proportional to a dot gain (or a dot density), and is correlated with an ejection amount or ejection speed (or halftone %) of the droplets 14.

As understood from FIG. 11, a control parameter for compensating for a density variation of an image due to a specified non-ejection state is set. In other words, dot gains of the nearest adjacent nozzles 44*n* are relatively increased so as to increase a density around the ejection position of the specified nozzle 44*d*. In addition, dot gains of the second nearest adjacent nozzles 44*m* are relatively reduced so as to reduce densities around the ejection positions of the nearest adjacent nozzles 44*n*.

Effects According to this Ejection Condition Determination Method.

Returning to FIG. 1, the ejection condition data 34 which is stored in the data storage portion 18 in advance is referred to when an image is formed on the sheet 12 using the recording head 40. In other words, the head driver 38 multiplies a dot gain corresponding to each nozzle 44 by an input control signal, and controls ejection of each recording head 40 on the basis of an obtained signal value. Thus, it is possible to realize non-ejection correction on any image.

As shown in FIGS. 12A-12D, in a case where curved ejection occurs in the specified nozzle 44*d*, visible white stripe unevenness and black stripe unevenness are generated on an image 90. In contrast, it is possible to obtain a favorable image 91 on which stripe unevenness is not viewed by selecting an appropriate ejection condition. In addition, dot gains of the second nearest adjacent nozzles 44*m* are relatively reduced so as to achieve a so-called decimation effect and to thereby improve robustness to disparity between landing positions and landing interference of the droplets 14 ejected from the nearest adjacent nozzles 44*n*. Accordingly, it is possible to obtain favorable images 92 and 93 in which stripe unevenness is not viewed.

As described above, since a filter processing corresponding to human visual characteristics (the visual characteristic data items 30) is performed on drawing data representing two or more flat patterns 70 which are different in density distribution, it is possible to obtain drawing data representing a drawing form closer to a manner viewed by a user, that is, visual correction drawing data. In addition, since an ejection condition (the ejection condition data 34) for compensating for a density variation of an image caused by a specified non-ejection state is determined based on an evaluation result obtained by respectively evaluating the two or more flat patterns 70 having been subjected to the filter processing according to predetermined evaluation conditions (the evaluation condition data items 32), it is possible to automatically determine an optimal ejection condition while comparing and evaluating two or more kinds of ejection conditions, respectively. Therefore, it is possible to considerably reduce the number of operation steps and to determine an ejection condition conforming to a user's sense.

Configuration According to Second Embodiment

Figure 13:
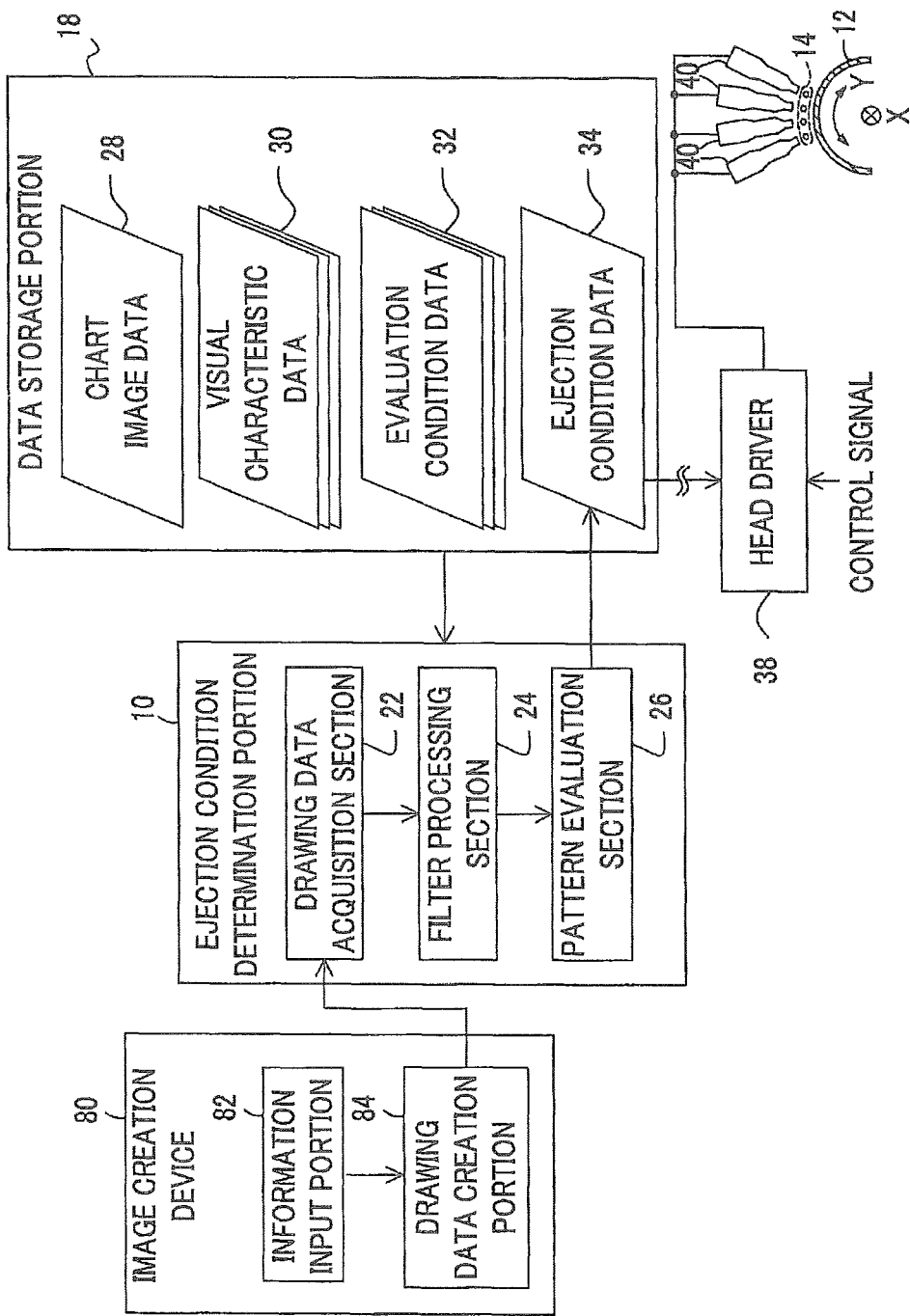
FIG. 13 is a schematic block diagram illustrating a main configuration for realizing an ejection condition determination method according to a second embodiment.

FIG. 13 is a schematic block diagram illustrating a main configuration for realizing an ejection condition determination method according to a second embodiment. In addition, the same constituent elements as in the first embodiment have the same reference numerals and description thereof will be omitted.

The second embodiment has the substantially same configuration as the first embodiment shown in FIG. 1 but is different in that an image creation device 80 is provided instead of the scanning device 16. The image creation device 80 includes an information input portion 82 which inputs a variety of information (hereinafter, image forming information) for forming an image in an image forming apparatus 100 (refer to FIG. 15), and a drawing data creation portion 84 which creates digital data simulating the image adjusting chart 20 (refer to FIG. 7A) by using the image forming information input by the information input portion 82.

Operation of Ejection Condition Determination Portion 10

Figure 14:
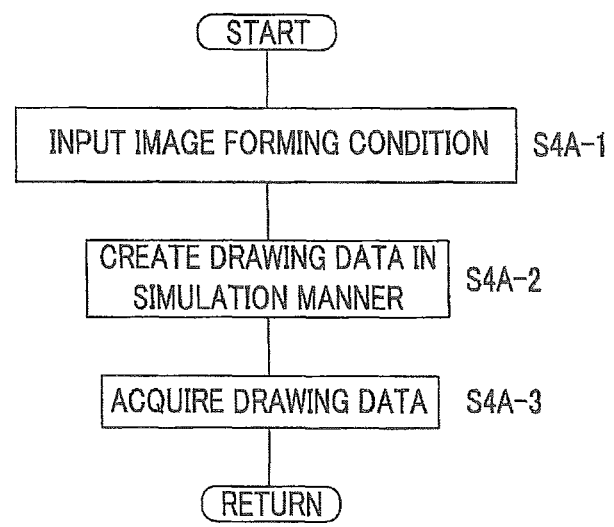
FIG. 14 is a specific flowchart regarding an acquisition method of drawing data in step S4A of FIG. 5.

Next, an operation of the ejection condition determination portion 10 shown in FIG. 13 will be described. This operation is basically the same as in the flowchart of FIG. 5, but step S4A is executed instead of step S4 for reading an image of the image adjusting chart 20. Hereinafter, a detailed description thereof will be made with appropriate reference to the flowchart of FIG. 14 and other drawings.

In step S4A-1, the information input portion 82 inputs image forming information provided for creating an image. Here, the image forming information includes a variety of information regarding the image forming apparatus 100 including an output resolution, a variety of information regarding ink or the recording medium 12, and a variety of information regarding a drawing specification of the image adjusting chart 20 including the above-described ejection condition.

In step S4A-2, the drawing data creation portion 84 creates digital data simulating the image adjusting chart 20 (refer to FIG. 7A) by using the image forming information input in step S4A-1. The drawing data acquisition section 22 acquires the obtained digital data as drawing data without modification, or converts the digital data into device-independent data such as L*a*b.

In step S4A-3, the drawing data acquisition section 22 acquires the digital data created in step S4A-2. In the present embodiment, the image creation device 80 and the ejection condition determination portion 10 are shown as different constituent elements, but each function of the information input portion 82 and the drawing data creation portion 84 may be executed by the ejection condition determination portion 10.

In the above-described way, the drawing data acquisition section 22 acquires the drawing data simulating the image adjusting chart 20 (step S4A).

In addition, unlike in the first embodiment, since a drawing specification (for example, a definition of a pixel value and a position in the unit of a pixel) in the drawing data is known, it is possible to efficiently perform a filter processing (step S6 of FIG. 5) or evaluation (step S7 of FIG. 5) of each drawing pattern by using this information. In addition, as shown in FIGS. 10A to 10D, an ejection condition of the droplets 14 may be sequentially determined.

Effects According to this Ejection Condition Determination Method.

As above, image forming information regarding the image forming apparatus 100 (refer to FIG. 15) is input, and digital data simulating a difference in density distribution on the image adjusting chart 20 is created using the image forming information. Therefore, it is possible to easily determine an ejection condition conforming to a user's sense without actually forming the image adjusting chart 20. Particularly, since consumable materials such as ink or the recording medium 12 are not necessary, costs are reduced.

Configuration of Image Forming Apparatus 100

Successively, a description will be made of an ejection condition determination method related to the above-described first and second embodiments and the image forming apparatus 100 capable of realizing an image forming method using this method. FIG. 15 is a cross-sectional side view illustrating a configuration of the image forming apparatus 100.

The image forming apparatus 100 is provided with a paper feeding and transport portion 114 which feeds and transports the sheet 12 on the upstream side in the transport direction of the sheet 12 (in the example of FIG. 15, flat paper). A treatment liquid application portion 116 which applies a treatment liquid on a recording surface (hereinafter, referred to as an image forming surface) of the sheet 12, an image forming portion 118 which forms an image by attaching the droplets 14 (refer to FIG. 1) of ink onto the image forming surface, an ink drying portion 120 which dries ink of a treatment liquid layer formed on the sheet 12, an image fixing portion 122 which fixes the image of the treatment liquid layer to the sheet 12, and a discharge portion 124 which discharges the sheet 12 to which the image is fixed, are provided on the downstream side of the paper feeding and transport portion 114 in the transport direction of the sheet 12.

The paper feeding and transport portion 114 includes a stacking section 126 which is provided so as to stack the sheets 12, a paper feeding section 128 which feeds the sheets 12 stacked on the stacking section 126 one by one, and a transport section 130 which transports the sheet 12 fed by the paper feeding section 128 to the treatment liquid application portion 116.

The treatment liquid application portion 116 includes a treatment liquid application drum 132 which is rotatably provided, a treatment liquid application device 134 which applies a treatment liquid on the image forming surface of the sheet 12, and a treatment liquid drying device 136 which dries the treatment liquid. Thus, a thin treatment liquid layer is applied on the image forming surface of the sheet 12.

A first intermediate transport drum 138 is rotatably disposed between the treatment liquid application portion 116 and the image forming portion 118. The first intermediate transport drum 138 is rotated in a state in which the sheet 12 is held on the surface of the first intermediate transport drum 138, and thus the sheet 12 supplied from the treatment liquid application portion 116 side is transported to the image forming portion 118 side.

The image forming portion 118 includes an image forming drum 140 (transport section) which is rotatably provided, and a head unit 142 which ejects the droplets 14 onto the sheet 12 transported by the image forming drum 140. The head unit 142 includes the recording heads 40 (refer to FIG. 1) of at least Y (yellow), M (magenta), C (cyan), and K (black) which are primary colors. In addition, the respective recording heads 40 are arranged in the circumferential direction of the image forming drum 140. Therefore, images of the respective colors are sequentially formed on the treatment liquid layer applied on the image forming surface of the sheet 12. Further, the treatment liquid has an effect of condensing color materials (pigments) and latex particles dispersed in a solvent of the ink, and thus can prevent the color materials from flowing on the sheet 12.

A second intermediate transport drum 146 which is rotatably provided is disposed between the image forming portion 118 and the ink drying portion 120. The second intermediate transport drum 146 is rotated in a state in which the sheet 12 is held on the surface of the second intermediate transport drum 146, and thus the sheet 12 supplied from the image forming portion 118 side is transported to the ink drying portion 120 side.

The ink drying portion 120 includes an ink drying drum 148 which is rotatably provided, and a plurality of hot air nozzles 150 and a plurality of infrared heaters (heaters 152) which dry the treatment liquid layer of the sheet 12. Thus, the solvent of the ink remaining in the treatment liquid layer of the sheet 12 is dried.

A third intermediate transport drum 154 which is rotatably provided is disposed between the ink drying portion 120 and the image fixing portion 122. The third intermediate transport drum 154 is rotated in a state in which the sheet 12 is held on the surface of the third intermediate transport drum 154, and thus the sheet 12 supplied from the ink drying portion 120 side is transported to the image fixing portion 122 side.

The image fixing portion 122 includes an image fixing drum 156 which is rotatably provided, a heating roller 158 which is disposed so as to be close to the surface of the image fixing drum 156, and a fixing roller 160 which is disposed in a state of coming into pressing contact with the surface of the image fixing drum 156. Therefore, the latex particles condensed in the treatment liquid layer are heated and pressed and are thus fixed onto the sheet 12 as an image.

The sheet 12 to which the image of the image forming surface is fixed through the above-described respective steps is transported to the discharge portion 124 side provided on the downstream side of the image fixing portion 122 through rotation of the image fixing drum 156.

Description of Control System of Image Forming Apparatus 100

Figure 16:
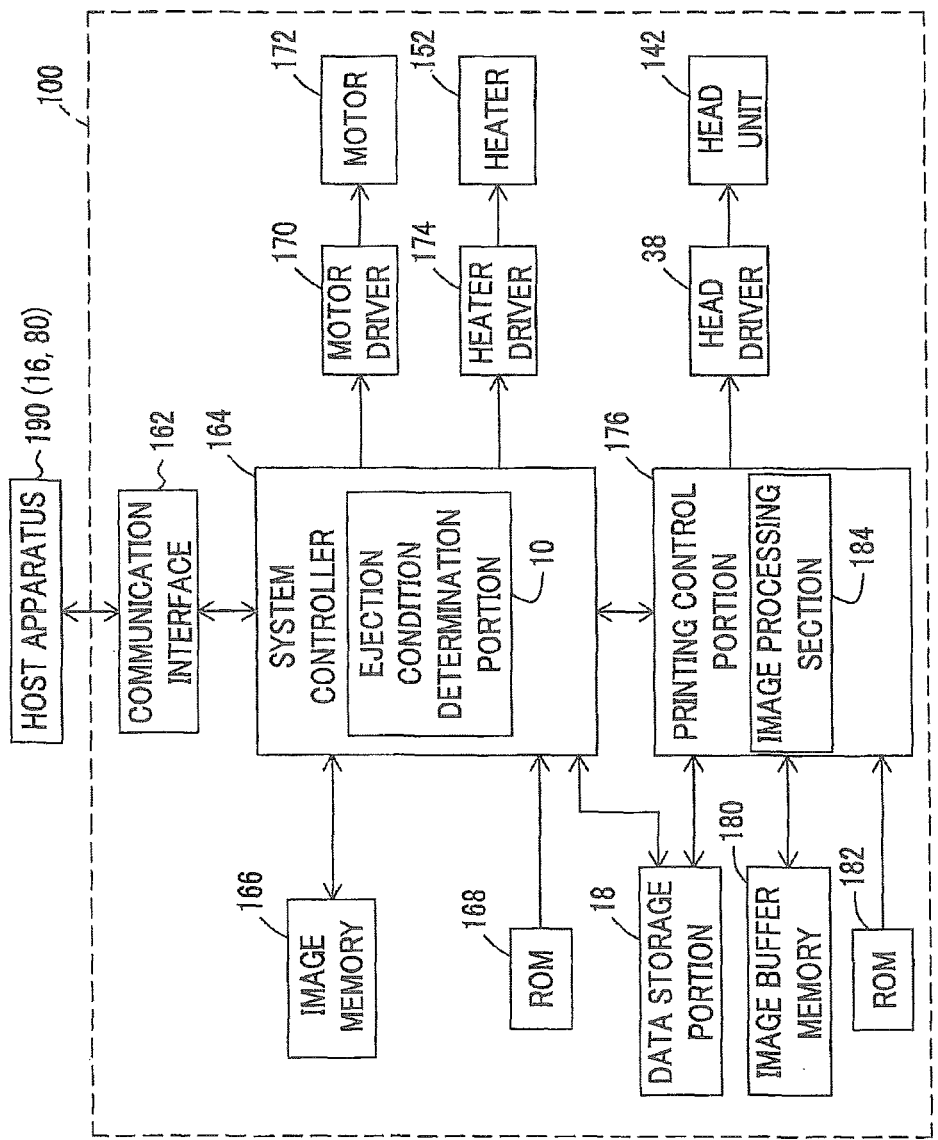
FIG. 16 is an electrical block diagram illustrating a system configuration of the image forming apparatus shown in FIG. 15.

FIG. 16 is a block diagram illustrating a system configuration of the image forming apparatus 100 shown in FIG. 15. The image forming apparatus 100 includes not only the data storage portion 18, the head driver 38 (refer to FIG. 1 with regard to both of the two), the head unit 142, and the heater 152 (refer to FIG. 15 with regard to both of the two), but also a communication interface 162, a system controller 164, an image memory 166, a ROM 168, a motor driver 170, a motor 172, a heater driver 174, a printing control portion 176, an image buffer memory 180, and a ROM 182.

The communication interface 162 is an interface portion with a host apparatus 190, and is used for a user to instruct the image forming apparatus 100 to form an image or the like. The communication interface 162 may employ a serial interface such as a universal serial bus (USB), IEEE1394, Ethernet (registered trademark), or a wireless network, or a parallel interface such as Centronics. A buffer memory (not shown) for speeding up communication may be mounted in this portion.

An image signal sent from the host apparatus 190 is received by the image forming apparatus 100 via the communication interface 162 and is temporarily stored in the image memory 166. The image memory 166 is storage means for storing an image signal input via the communication interface 162, and reads and writes information via the system controller 164. The image memory 166 is not limited to a memory formed by semiconductor elements, and may use a magnetic medium such as a hard disk.

The system controller 164 includes a central processing unit (CPU) and peripheral circuits, functions as a control device controlling the overall image forming apparatus 100 according to a predetermined program, and functions as an operation device including the ejection condition determination portion 10 and performing various operations. In other words, the system controller 164 controls the respective portions such as the communication interface 162, the image memory 166, the motor driver 170, and the heater driver 174. In addition, the system controller 164 performs communication control with the host apparatus 190, reading and writing control of the image memory 166 and the ROM 168, and the like. Further, the system controller 164 generates control signals for controlling the motor 172 and the heaters 152 of the sheet transport system. Furthermore, an image signal stored in the image memory 166 as well as the control signal is transmitted to the printing control portion 176.

The ROM 168 stores programs executed by the CPU of the system controller 164 and a variety of data necessary for control. The image memory 166 is used as a temporary storage region of an image signal and is used as a development region of a program and an operation work region of the CPU.

The motor driver 170 is a driver (driving circuit) which drives the motor 172 of the sheet transport system in response to an instruction from the system controller 164. The heater driver 174 is a driver which drives the heaters 152 in response to an instruction from the system controller 164.

On the other hand, the printing control portion 176 includes a CPU and peripheral circuits, and performs processes such as various processings for generating an ejection control signal from an image signal of the image memory 166 and correction and supplies the generated ink ejection data (control signal) to the head driver 38 so as to control ejection driving of the head unit 142 under the control of the system controller 164.

The printing control portion 176 includes the image buffer memory 180, and an image signal or data such as a parameter is temporarily stored in the image buffer memory 180 when the printing control portion 176 processes the image signal.

The printing control portion 176 is connected to the ROM 182 which stores programs executed by the CPU of the printing control portion 176 and a variety of data necessary for control. The ROM 182 may be read only storage means, but preferably uses rewritable storage means such as an EEPROM in a case where a variety of data is updated as necessary.

An image processing section 184 generates dot disposition data for each ink color from an input image signal. In other words, a halftone process is performed on the input image signal so as to determine a dot forming position (ink ejection timing). The halftone process may employ an ordered dither method, an error diffusion method, a density pattern method, a random dot method, and the like. In addition, in a case where a dot density is changed so as to realize non-ejection correction, the image processing section 184 may perform the halftone process after adjusting a part of the input image signal by referring to the ejection condition data 34 (refer to FIG. 1) stored in the data storage portion 18.

In addition, in the example of FIG. 16, the ejection condition determination portion 10 and the image processing section 184 are respectively included in the system controller 164 and the printing control portion 176. For example, the ejection condition determination portion 10 and/or the image processing section 184 may be configured separately from the system controller 164 or the printing control portion 176.

In addition, the printing control portion 176 has an ink ejection data generation function of generating ink ejection data (a control signal of the actuators corresponding to the nozzles 44 of the recording head 40) and a driving waveform generation function on the basis of the dot disposition data generated by the image processing section 184.

The ink ejection data generated using the ink ejection data generation function is sent to the head driver 38 so as to control an ink ejection operation of the head unit 142. During the control, the above-described non-ejection correction is performed by referring to the ejection condition data 34 (refer to FIG. 1) stored in the data storage portion 18.

The driving waveform generation function is a function of generating a driving signal waveform for driving the actuator corresponding to each nozzle 44 of the recording head 40. A signal (driving waveform) generated using the driving waveform generation function is supplied to the head driver 38.

Other Configurations of Recording Head 40

A configuration of the recording head 40 is not limited to the example of FIGS. 2 to 4. For example, a shape of the pressure chamber 45 is not limited to this example, and various forms may be employed in which a planar shape is a tetragonal shape (a diamond shape, a rectangular shape, or the like), a pentagonal shape, a hexagonal shape, other polygonal shapes, a circular shape, an elliptical shape, and the like.

In addition, instead of the configuration of FIG. 2, as shown in FIG. 17A, short head modules 40a in which a plurality of nozzles 44 are arranged in a two-dimensional manner may be arranged in a zigzag shape and be connected to each other so as to form a long line head. As shown in FIG. 17B, a form may be employed in which head modules 40b are arranged in a line and are connected to each other.

Further, an ejection mechanism of the droplets 14 by the recording head 40 may employ various types. In addition to a type (refer to FIG. 3) of ejecting the droplets 14 through deformation of an actuator formed by a piezoelectric element and the like, a thermal jet type may be employed in which a heating element such as a heater heats ink so as to generate bubbles and the droplets 14 are ejected by a pressure thereof.

In addition, the present invention is not limited to the above-described embodiment, and can be freely modified in the scope without departing from the spirit of the invention.

Although, in the above-described embodiment, the graphic art (printing) usage is exemplified, an applicable scope of the present invention is not limited thereto. The present invention is applicable to various image forming apparatuses capable of forming an image pattern, such as, for example, a wire drawing apparatus of an electronic circuit board, a manufacturing device of various devices, a resist printing apparatus using a resin liquid as a functional liquid (corresponding to "ink") for ejection, and a micro-structure forming apparatus.

In addition, although, in the above-described embodiment, only the sheet 12 is transported through rotation of the image forming drum 140, at least one of the head unit 142 and the sheet 12 may be transported. The present invention is applicable to a configuration in which both of the head unit and the sheet 12 are relatively moved.

What is claimed is:

1. An ejection condition determination method in an image forming apparatus configured to relatively move a recording medium once with respect to a recording head including a plurality of recording elements configured to eject droplets in a transport direction crossing an arrangement direction of the plurality of recording elements, so as to form an image formed by a plurality of dots on the recording medium, the method comprising:

selecting two or more kinds of ejection conditions regarding other recording elements than a specified recording element among the plurality of recording elements;

acquiring drawing data representing two or more drawing patterns having different density distributions, the drawing data being acquired by respectively forming same drawing patterns using the selected two or more kinds of ejection conditions in a specified non-ejection state in which there is no ejection of the droplets from the specified recording element;

performing a filter processing for modulating a spatial frequency component with a visual transfer function on the acquired drawing data so as to obtain visual correction drawing data; and determining the ejection conditions for compensating for a density variation of the image due to the specified non-ejection state based upon evaluation results which are obtained by respectively evaluating two or more drawing patterns represented by the visual correction drawing data and having been subjected to the filter processing according to a predetermined evaluation condition.

2. The ejection condition determination method according to claim 1, wherein, in the selecting of the two or more kinds of ejection conditions, the two or more kinds of ejection conditions are selected in which dot forming conditions for forming the dots are different for at least one of the recording elements adjacent to the specified recording element.

3. The ejection condition determination method according to claim 2, wherein the dot forming condition includes at least one of an ejection amount of the droplets, an ejection speed of the droplets, and a dot density.

4. The ejection condition determination method according to claim 3, wherein the selecting of the two or more kinds of ejection conditions, the acquiring of the drawing data, the performing of the filter processing, and the determining of the ejection conditions are sequentially and repeatedly performed, so as to sequentially determine the dot forming condition for the recording elements and to fix the ejection conditions.

5. The ejection condition determination method according to claim 4, wherein the dot forming conditions for the recording elements located outside the specified recording element in a predetermined direction are sequentially determined so as to fix the ejection conditions.

6. The ejection condition determination method according to claim 2, wherein the selecting of the two or more kinds of ejection conditions, the acquiring of the drawing data, the performing of the filter processing, and the determining of the ejection conditions are sequentially and repeatedly performed, so as to sequentially determine the dot forming condition for the recording elements and to fix the ejection conditions.

7. The ejection condition determination method according to claim 6, wherein the dot forming conditions for the recording elements located outside the specified recording element in a predetermined direction are sequentially determined so as to fix the ejection conditions.

8. The ejection condition determination method according to claim 2, wherein the same drawing pattern comprises a flat pattern having a uniform color.

9. The ejection condition determination method according to claim 2, further comprising:
forming the two or more drawing patterns as the image on the recording medium by using the image forming apparatus,
wherein, in the acquiring of the drawing data, the two or more formed drawing patterns are read using a scanning device adopted to optically read the image, so as to acquire the drawing data.

10. The ejection condition determination method according to claim 9, wherein, in the acquiring of the drawing data, the two or more drawing patterns are read in a reading direction which is determined according to optical transfer characteristics of the scanning device, so as to acquire the drawing data.

11. The ejection condition determination method according claim 2, further comprising:
inputting image forming information regarding the image forming apparatus,
wherein, in the acquiring of the drawing data, digital data simulating difference in density distribution is created using the input image forming information, so as to acquire the drawing data.

12. An image forming method comprising:
forming the image by controlling ejection of the recording head in the specified non-ejection state based upon the ejection conditions determined using the method according to claim 2.

13. An image forming apparatus comprising the recording head of which ejection is controlled in the specified non-ejection state based upon the ejection conditions determined using the method according to claim 2, so as to form the image.

14. The ejection condition determination method according to claim 1, wherein the same drawing pattern comprises a flat pattern having a uniform color.

15. The ejection condition determination method according to claim 1, further comprising:
forming the two or more drawing patterns as the image on the recording medium by using the image forming apparatus,
wherein, in the acquiring of the drawing data, the two or more formed drawing patterns are read using a scanning device adopted to optically read the image, so as to acquire the drawing data.

16. The ejection condition determination method according to claim 15, wherein, in the acquiring of the drawing data, the two or more drawing patterns are read in a reading direction which is determined according to optical transfer characteristics of the scanning device, so as to acquire the drawing data.

17. The ejection condition determination method according claim 1, further comprising:
inputting image forming information regarding the image forming apparatus,
wherein, in the acquiring of the drawing data, digital data simulating difference in density distribution is created using the input image forming information, so as to acquire the drawing data.

18. An image forming method comprising:
forming the image by controlling ejection of the recording head in the specified non-ejection state based upon the ejection conditions determined using the method according to claim 1.

19. An image forming apparatus comprising the recording head of which ejection is controlled in the specified non-ejection state based upon the ejection conditions determined using the method according to claim 1, so as to form the image.

* * * * *